United States Patent [19]
Stacey

[11] 4,416,475
[45] Nov. 22, 1983

[54] FLEXIBLE COUPLING

[75] Inventor: Ralph C. Stacey, Greenfield Center, N.Y.

[73] Assignee: Tarrant Manufacturing Company, Saratoga Springs, N.Y.

[21] Appl. No.: 448,242

[22] Filed: Dec. 9, 1982

[51] Int. Cl.³ .................. F16L 27/10; F16L 55/00; F16L 27/00; A47L 9/24
[52] U.S. Cl. .................................. 285/229; 285/7; 285/49; 285/272
[58] Field of Search ............ 285/229, 272, 7, 226, 285/223, 49; 2/2.1

[56] References Cited

U.S. PATENT DOCUMENTS

| | | | |
|---|---|---|---|
| 2,352,038 | 6/1944 | Tolke | 285/229 |
| 2,770,259 | 11/1956 | Zallea | 285/229 |
| 2,865,660 | 12/1958 | Zallea | 285/229 |
| 2,879,804 | 3/1959 | Hammond | 285/229 |
| 2,939,148 | 6/1960 | Hart et al. | 2/2.1 A X |
| 3,030,626 | 4/1962 | Shepard | 2/2.1 A |
| 3,061,039 | 10/1962 | Peters | 285/229 |
| 3,359,014 | 12/1967 | Clements | 285/229 |
| 3,473,828 | 10/1969 | Pearson | 285/229 |
| 3,552,776 | 1/1971 | Leymann | 285/229 |
| 3,642,309 | 2/1972 | Horrdbin et al. | 285/226 |
| 3,666,296 | 5/1972 | Fischetti | 285/229 |
| 4,026,585 | 5/1977 | Berghofer | 285/229 |
| 4,155,573 | 5/1979 | Ehlers | 285/229 |
| 4,186,949 | 2/1980 | Bartha et al. | 285/229 |
| 4,220,180 | 9/1980 | Koga et al. | 285/229 |
| 4,241,944 | 12/1980 | Clark | 285/229 |
| 4,258,938 | 5/1981 | Davy | 285/229 |
| 4,283,078 | 8/1981 | Ross et al. | 285/229 |
| 4,293,152 | 10/1981 | Berghofer | 285/229 |

Primary Examiner—Richard J. Scanlan, Jr.
Attorney, Agent, or Firm—Walter F. Wessendorf, Jr.

[57] ABSTRACT

Disclosed is a flexible coupling whose operative interposition between communicating members affords the relative relationship of 360° rotation, axial alignment, misalignment, offset relationship, articulation at different angles axially. The flexible coupling is self-cleaning and acts as a vibration dampener. The flexible coupling has upstream and downstream collars which mount a U-shaped annular flexible member whose one end portion is fixed to the upstream collar between an annular flange and keeper plate and whose other end portion is freely retained on the downstream collar between annular flanges.

8 Claims, 3 Drawing Figures

FLEXIBLE COUPLING

BACKGROUND OF THE INVENTION

1. Technical Field

This invention relates to a flexible coupling for use with the suction inlet port of the sludge receiver box of a vacuum catch basin cleaner and the proximal end portion of a suction hose assembly so that the distal end of the rigid suction duct component of the suction hose assembly can be moved and positioned easily for operative introduction into a catch basin to clean same and remove therefrom dirt, sand, sludge, leaves and other accumulated debris.

2. Background Art

The prior art, U.S. Pat. No. 2,352,038 discloses resilient tubular bodies; U.S. Pat. No. 2,770,259 discloses an expansion joint and apparatus for and method of making same; U.S. Pat. No. 2,865,660 discloses an internally reinforced bellows-type expansion joint unit; U.S. Pat. No. 2,879,804 discloses a reinforced expansion joint; U.S. Pat. No. 3,061,039 discloses fluid line sound-absorbing structures; U.S. Pat. No. 3,359,014 discloses pipe couplings; U.S. Pat. No. 3,473,828 discloses flexible couplings for providing fluid; U.S. Pat. No. 3,552,776 discloses a deformable pipe connector; U.S. Pat. No. 3,666,296 discloses expansion joints for rigid metallic pipes; U.S. Pat. No. 4,026,585 discloses a flexible pipe coupling; U.S. Pat. No. 4,155,573 discloses an elastic pipe connector; U.S. Pat. No. 4,186,949 discloses an elastic pipe-connecting component for pipes or pipelines, or the like; U.S. Pat. No. 4,220,180 discloses a flexible pipe joint; U.S. Pat. No. 4,241,944 discloses an expansion joint; U.S. Pat. No. 4,258,938 discloses pipe couplings; U.S. Pat. No. 4,283,078 discloses a flexible joint protector; and U.S. Pat. No. 4,293,152 discloses a flexible pipe-connecting fitting.

The problem in the art to which this invention apertains is the need for a flexible coupling that can be interposed between and operatively connected to the proximal end portion of a suction hose assembly and the suction inlet port of the sludge receiver box of a vacuum catch basin cleaner so that the distal end of the rigid suction duct component of the suction line assembly can be moved and positioned easily for operative introduction into a catch basin to clean same and to remove therefrom dirt, sand, sludge, leaves and other accumulated debris.

To easily move and position the distal end of such rigid suction duct component, the proximal end portion of the flexible hose component of the suction line assembly—relative to the suction inlet port by means of such flexible coupling that joins the two together—must be capable of 360° rotation or swivel, must be capable of being aligned, misaligned or offset relative to the longitudinal axis of the suction inlet port and the proximal end portion of such flexible hose component, must be capable of being articulated or disposed at different angles to each other, and the flexible coupling, per se, must create a self-cleaning vortex as a result of air turbulence so that the flexible coupling will not clog up and thereby malfunction from dirt, sand, sludge, leaves or other debris flowing therethrough, and the flexible coupling should function as a vibration dampener between the sludge receiver box and the suction hose assembly.

This invention contributes to the solution of the problems of the art by providing a flexible coupling that can be interposed in operative interconnected relationship between the proximal end portion of the suction inlet port of the sludge receiver box of the vacuum catch basin cleaner and the suction hose assembly. The flexible coupling: permits of 360° relative rotation between the suction inlet port and the proximal end portion of the suction hose assembly; permits alignment, misalignment and offset disposition relative to the longitudinal axes of the suction inlet port and the proximal end portion of the suction hose assembly; permits relative disposition at different angles to each other of the suction inlet port and the proximal end portion of the suction hose assembly; creates a self-cleaing vortex as a reslt of air turbulence in the annular flexible member component of such flexible coupling so that such flexible coupling will not clog up from any dirt, sand, sludge, leaves or other debris flowing through such flexible coupling and which is disposed and deposited laterally into such annular flexible member component as a result of centrifugal force; and functions as a vibration dampener between the sludge receiver box and the suction hose assembly.

SUMMARY OF THE INVENTION

In accordance with the invention, there is provided a flexible coupling comprising an upstream collar and a downstream collar which mount therebetween an annular flexible member of U-shaped cross section having upstream and downstream end portions, with the upstream end portion in fixed relationship on the upstream collar and with the downstream end portion in free relationship on the downstream collar.

The upstream collar is operatively connected to the proximal end portion of the suction hose assembly and the downstream collar is operatively connected to the suction inlet port of the sludge receiver box of the vacuum catch basin cleaner. Such interposed flexible coupling allows with respect to the longitudinal axes of the upstream collar and hence the proximal end portion of the suction hose assembly, and of the downstream collar and hence the suction inlet port: 360° relative rotation; relative alignment, misalignment and offset disposition; and relative disposition at different angles to each other. By its construction, such flexible coupling further creates a self-cleaning vortex as a result of air turbulence in its annular flexible member and functions as a vibration dampener between the sludge receiver box and suction hose assembly.

Such flexible coupling interposed and interconnected between the suction inlet port and suction hose assembly provides the following functional attributes:

(1) It allows increased flexibility over a simple rigid connection allowing the operator of the vacuum catch basin cleaner to reach more area with less effort.

(2) It extends the life of the flexible hose component of the suction hose assembly that is connected between the rigid suction duct component of the suction hose assembly and the upstream collar of the flexible coupling by minimizing sharp bends in such flexible hose component during operation or travel to and from the work site.

(3) It further extends the life of such flexible hose component by permitting easy rotation of such flexible hose component on a routine basis thus evening-out the wear.

(4) As compared with the cadium plated steel ball joint utilized in the current state of the art, the flexible coupling of this invention remains flexible after prolonged service. Such steel ball joint becomes contaminated with dirt, sand, sludge, leaves and other debris in its close tolerance area which causes the steel ball joint to bind and malfunction. Such debris also breaks through the plating of the cadium steel ball joint and accelerates corrosion by holding moisture close to the exposed steel. Invariably the steel ball joint is not serviceable within a few years. The steel ball joint requires cleaning and lubrication at a minimum every month to keep it functioning, whereas the flexible coupling of this invention requires no maintenance and will last the life of the vacuum catch basin cleaner or other equipment with which it is utilized. The steel ball joint leaks air which wastes power, energy and suction, whereas the flexible coupling is sealed. The flexible coupling weighs less than the steel ball joint and costs considerably less.

(5) The flexible coupling is self-cleaning. The smooth rounded shape of its annular flexible member facilitates the eddy currents therein. With the air velocity in the flexible coupling in the 160 MPH range, there is considerable turbulence.

(6) The wide U-shaped construction of the annular flexible member utilized in the flexible coupling provides a high degree of flexibility and resistance to high-vacuum forces.

(7) The flexible coupling is strong enough so that it can carry the weight of the suction hose assembly on its upstream collar and, until articulated, maintain alignment of the upstream and downstream collars with the suction inlet port of the sludge receiver box.

(8) When utilized with leaf-vacuum equipment, the flexible coupling facilitates alignment of a fan-type suction nozzle on the distal end of the rigid duct component of the suction hose assembly with prevailing ground surfaces.

BRIEF DESCRIPTION OF THE DRAWINGS

These objects and other objects of the invention should be discerned and appreciated by reference to the drawings, wherein like reference numerals refer to similar parts throughout the several views, in which.

DESCRIPTION OF THE PREFERRED EMBODIMENT

Figure 1:
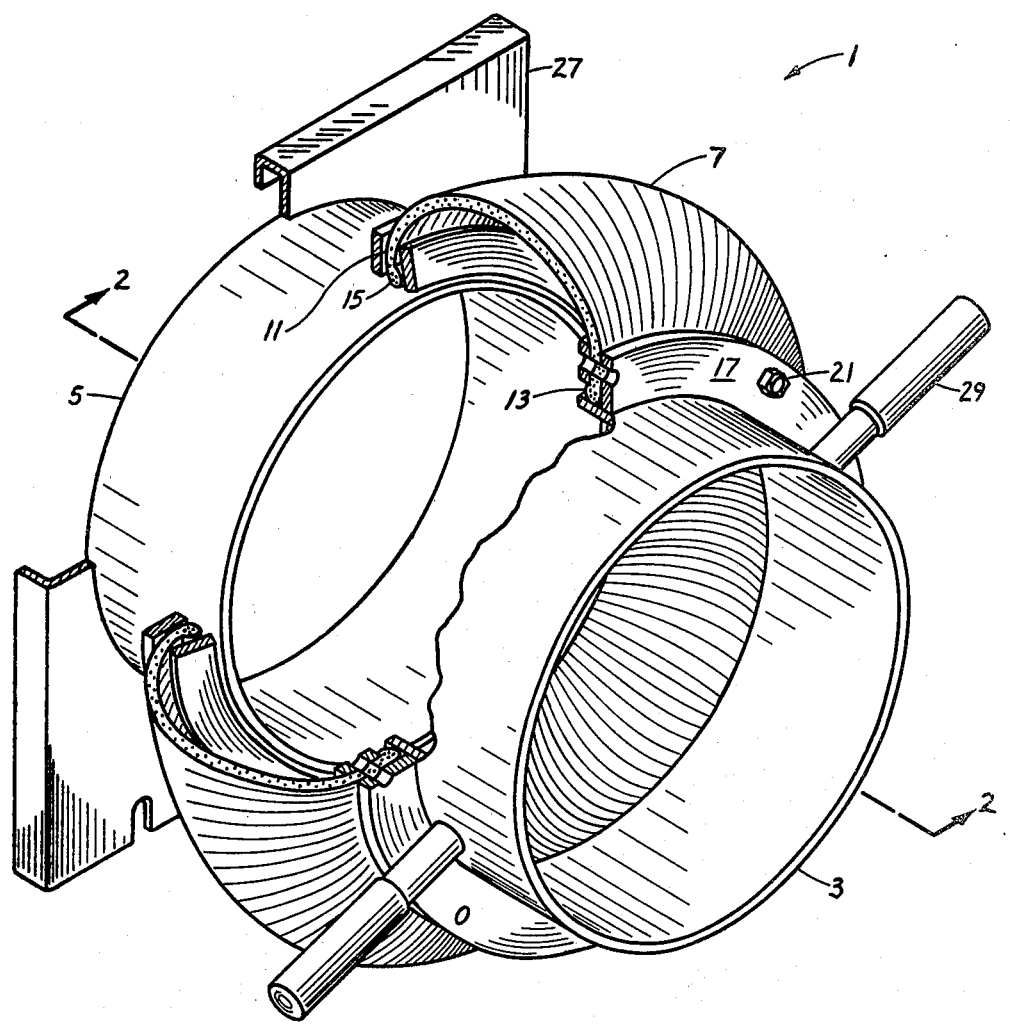
FIG. 1 is a view of the flexible coupling of this invention.

In FIG. 1 of the drawings, reference numeral 1 generally refers to the flexible coupling of this invention. Flexible coupling 1 comprises an upstream collar 3 and a downstream collar 5 which mount therebetween an annular flexible member 7 of U-shaped cross section having upstream and downstream end portions 9 and 11 which terminate in respective upstream and downstream beads 13 and 15. The collars 3 and 5 are made of steel or other suitable material, and the flexible member 7 is made of rubber or other suitable material.

Upstream collar 3 carries in fixed relationship on its outer periphery, such as by being welded thereto, an upstream annular flange 17. Upstream annular flange 17 and a downstream annular keeper plate 19 sandwich and seal therebetween the upstream end portion 9 of flexible member 7 by means of suitable bolts 21 disposed in engaged relationship with annular flange 17 and annular keeper plate 19, and with the upstream bead 13 being in engaged abutting and sealing relationship with the outer periphery of upstream collar 3.

Downstream collar 5 carries in fixed relationship on its outer periphery, such as by being welded thereto, an upstream annular flange 23 and a downstream annular flange 25 which mount freely therebetween but in retentive relationship the downstream end portion 11 of annular flexible member 7, and with the downstream bead 15 being in engaged abutting and sealing relationship with the outer periphery of downstream collar 5. The upstream annular flange 23 is angled, as shown, towards the downstream annular flange 25.

The downstream collar 5 communicates with and is in fixed relationship, such as by being welded thereto, with inlet cover 27. The inlet cover 27 is disposed in operative mounting relationship with a suction inlet port of the sludge receiver box of the vacuum catch basin cleaner (not shown).

The upstream collar 3 carries in operative mounting relationship the proximal end portion of the flexible hose component of a suction hose assembly (not shown). Such suction hose assembly has distally a rigid suction duct component operatively connected proximally to and communicating with such flexible hose. The flexible hose in interposed between, is operatively connected to and communicates with both the rigid suction duct distally and the upstream collar 3 proximally. The distal end of the rigid suction duct is introduced into a catch basin to clean same and to remove therefrom dirt, sand, sludge, leaves and other accumulated debris.

Handles 29, removably carried in transverse relationship on the upstream collar 3, facilitate the relative movements between the suction inlet port and the proximal end portion of the suction hose assembly as more fully described in the foregoing "Background of the Invention" and "Summary of the Invention".

Figure 2:
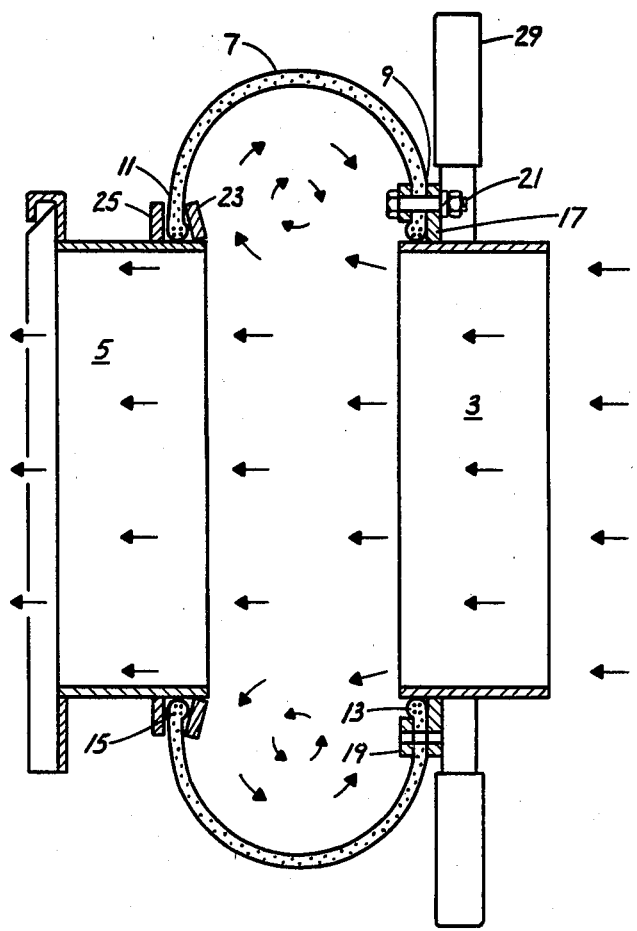
FIG. 2 is a sectional view taken in the direction of the arrows 2—2 in FIG. 1.

FIG. 2 has flow arrows to demonstrate the suction air flow of air, dirt, sand, sludge, leaves and other debris through flexible coupling 1. Centrifugal force will cause such dirt, sand, sludge, leaves and other debris to be laterally displaced and deposited against the inner surface of the upstream collar 3 and when same reaches the downstream side of upstream collar 3 same will diverge into the annular flexible member 7 and impinge upon and against the upstream annular flange 23 on the downstream collar 5. And since such upstream annular flange 23 is angled toward the downstream annular flange 25, such impinging dirt, sand, sludge, leaves and other debris will be directed by upstream annular flange 23 around the interior of the U-shaped annular flexible member 7 and will rejoin the air flow at the upstream side of the downstream collar 5 thereby creating such self-cleaning vortex that prevents any build-up or accumulation of dirt, sand, sludge, leaves or other debris in the interior of annular flexible member 7 which otherwise would cause the flexible coupling 1 to clog up and malfunction.

Figure 3:
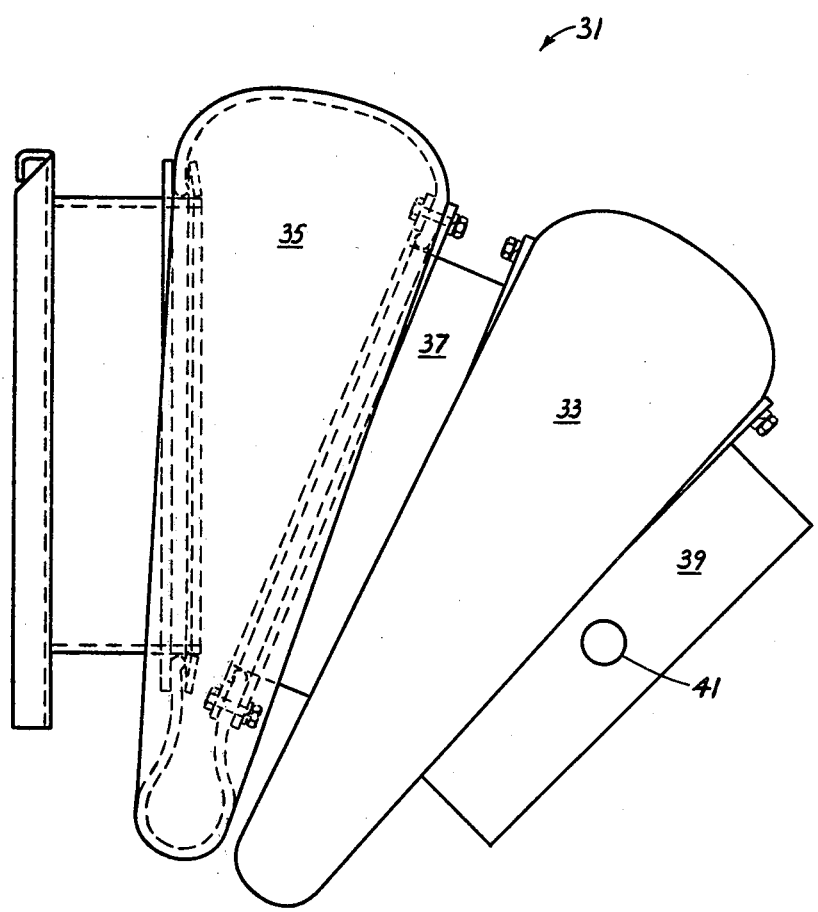
FIG. 3 is a view of an embodiment employing two flexible couplings joined together in tandem to provide greater articulation.

In FIG. 3 of the drawings, reference numeral 31 generally refers to the embodiment employing an upstream flexible coupling 33 and a downstream flexible coupling 35 operatively joined together in tandem to provide greater articulation than the single flexible coupling 1 provides.

Downstream flexible coupling 35 is similar to flexible coupling 1 but does not have handles on its upstream collar 37. Upstream flexible coupling 33 has an upstream collar 39 on which are removably carried handles 41 in transverse relationship therewith.

Upstream flexible coupling 33 differs from the single flexible coupling 1 in that two sets of flanges and keeper plates similar to flange 17 and keeper plate 19 are employed to sandwich and seal therebetween the end portion of the annular flexible member.

It should be appreciated that if still greater articulation is desired, more than two flexible couplings can be similarly joined together.

Having thusly described my invention, I claim:

1. A flexible coupling for flow of effluent therethrough, said flexible coupling comprising two collars and an annular flexible member, each of said collars having a longitudinal axis, one of said collars having means carrying said annular flexible member in fixed relationship therewith and the other of said collars having means freely mounting in retentive and sealing relationship said annular flexible member to allow 360° relative rotation or swivel of said collars and, with respect to said longitudinal axes of said collars, to allow relative alignment, misalignment and offset disposition, and relative disposition of said longitudinal axes of said collars at different angles to each other, and said flexible coupling having self-cleaning means to prevent such effluent from causing said flexible couping to clog up and malfunction.

2. A flexible coupling in accordance with claim 1, wherein said flexible coupling has vibration dampening means to dampen any vibrations within said flexible coupling.

3. A flexible coupling in accordance with claim 1, wherein one of said collars is an upstream collar and the other of said collars in a downstream collar, and wherein said effluent flows from said upstream collar to and through said downstream collar.

4. A flexible coupling in accordance with claim 3, wherein said annular flexible member has an upstream end portion, wherein said upstream collar has an annular flange and keeper plate comprising said means carrying said annular member in fixed relationship therewith, and wherein said annular flange and keeper plate of said upstream collar sandwich and seal therebetween said upstream end portion of said annular flexible member.

5. A flexible coupling in accordance with claim 3, wherein said annular flexible member has a downstream end portion, wherein said downstream collar has an upstream annular flange and a downstream annular flange comprising said means freely mounting in retentive and sealing relationship said annular flexible member, and wherein said upstream and downstream annular flanges of said downstream collar freely mount in retentive and sealing relationship therebetween said downstream end portion of said annular flexible member.

6. A flexible coupling in accordance with claim 4, wherein said annular flexible member has a downstream end portion, wherein said downstream collar has an upstream annular flange and a downstream annular flange comprising said means freely mounting in retentive and sealing relationship said annular flexible member, and wherein said upstream and downstream annular flanges of said downstream collar freely mount in retentive and sealing relationship therebetween said downstream end portion of said annular flexible member.

7. A flexible coupling in accordance with claim 5, wherein said downstream collar has an upstream side, and wherein said upstream annular flange of said downstream collar is angled towards said downstream annular flange of said downstream collar to effect self-cleaning of said annular flexible member by directing some of the effluent around the interior of said annular flexible member to rejoin the effluent flow at said upstream side of said downstream collar to thereby constitute said self-cleaning means to prevent such effluent from causing said flexible coupling to clog up and malfunction.

8. A flexible coupling in accordance with claim 5, wherein said annular flexible member has an upstream end portion, wherein said upstream collar has an annular flange and keeper plate comprising said means carrying said annular member in fixed relationship therewith, and wherein said annular flange and keeper plate of said upstream collar sandwich and seal therebetween said upstream end portion of said annular flexible member.

* * * * *